US012627392B2

(12) United States Patent
Yuang et al.

(10) Patent No.: US 12,627,392 B2
(45) Date of Patent: May 12, 2026

(54) OPTICAL VIRTUAL-CIRCUIT-SWITCHING NETWORK SYSTEM AND OPTICAL SWITCH THEREOF

(71) Applicant: GeNopsys Technologies, Inc., Dover, DE (US)

(72) Inventors: Chi-Jui Maria Yuang, Hsinchu (TW); Shan Zhong, Clarksville, MD (US); Po-Lung Tien, Hsinchu County (TW); Tien-Chien Lin, Keelung (TW)

(73) Assignee: GENOPSYS TECHNOLOGIES INC., Dover, DE (US)

( * ) Notice: Subject to any disclaimer, the term of this patent is extended or adjusted under 35 U.S.C. 154(b) by 276 days.

(21) Appl. No.: 18/610,685

(22) Filed: Mar. 20, 2024

(65) Prior Publication Data

US 2024/0322932 A1     Sep. 26, 2024

Related U.S. Application Data

(60) Provisional application No. 63/491,627, filed on Mar. 22, 2023.

(51) Int. Cl.
*H04J 14/02* (2006.01)
*H04Q 11/00* (2006.01)

(52) U.S. Cl.
CPC ...... *H04J 14/0212* (2013.01); *H04J 14/0286* (2013.01); *H04Q 2011/0015* (2013.01); *H04Q 2011/0016* (2013.01); *H04Q 2011/006* (2013.01)

(58) Field of Classification Search
None
See application file for complete search history.

(56) References Cited

U.S. PATENT DOCUMENTS

| | | | |
|---|---|---|---|
| 2006/0227957 A1 | 10/2006 | Dolan et al. | |
| 2021/0266089 A1* | 8/2021 | Lin | H04J 14/0212 |

FOREIGN PATENT DOCUMENTS

| | | |
|---|---|---|
| JP | 2019216418 A | 12/2019 |
| TW | 202002582 A | 1/2020 |

* cited by examiner

*Primary Examiner* — David W Lambert
(74) *Attorney, Agent, or Firm* — MUNCY, GEISSLER, OLDS & LOWE, P.C.

(57) ABSTRACT

An optical virtual-circuit-switching network system and optical switches thereof are provided. The optical virtual-circuit-switching network system includes multiple optical switches. Each optical switch includes an optical outbound handling module, an optical pass around module, and an optical inbound handling module. The optical outbound handling module transmits optical signals to both the horizontal optical network subsystem and the vertical optical network subsystem. The optical pass around module transmits optical signals from the horizontal optical network subsystem to the vertical optical network subsystem, or transmits optical signals from the vertical optical network subsystem to the horizontal optical network subsystem. The optical inbound handling module outputs the selected optical signals to dense wavelength-division multiplexing transceivers and, through these transceivers, converts the optical signals into electrical signals before forwarding the data to the top-of-rack switches.

10 Claims, 6 Drawing Sheets

OPTICAL VIRTUAL-CIRCUIT-SWITCHING NETWORK SYSTEM AND OPTICAL SWITCH THEREOF

CROSS-REFERENCES TO RELATED APPLICATIONS

This application claims the benefit of U.S. Provisional Application Ser. No. 63/491,627 filed on Mar. 22, 2023. The entirety of each Application is incorporated herein by reference.

BACKGROUND OF THE INVENTION

Field of the Invention

The present invention relates to an optical virtual-circuit-switching network system and an optical switch thereof, and in particular to an optical virtual-circuit-switching network system with scalable bandwidth and shareable paths.

Descriptions of the Related Art

In order to support high-performance computing (HPC), a data center network infrastructure that can flexibly provide high bandwidth and ultra-low-latency communications between servers is required. FIG. 1 illustrates an existing infrastructure 100 based on electrical switching, which includes a plurality of main switches 110, a plurality of secondary switches 120, a plurality of top-of-rack switches 130 and a plurality of servers 140.

The infrastructure 100 based on electrical switching uses a large number of low-cost secondary switches 120 and main switches 110 to provide full bisectional bandwidth with path diversity between the servers 140. Electrical switches are connected to optical fibers through optical transceivers, resulting in numerous optical-electrical-optical conversion, leading to high power consumption and transmission latency. In addition, the infrastructure based on electrical switching also faces challenges such as non-scalable bandwidth and complex wiring.

Furthermore, as shown in FIG. 2, in the electrical domain, virtual circuit switching has consistently been a primary packet-switching method. Multiple paths are established between the sending end 210 and the destination end 220. All packets pass through one of the paths during the connection, and are routed and electrically switched through the electrical switches 240 along the path, as indicated by the arrowed section in FIG. 2. This path is referred to as a virtual circuit 230, represented by the dashed line in FIG. 2. The traffic formed by packets through the "circuit" is considered dedicated to the end-user (i.e., the destination end 220). The term "virtual" means that this path is not physically dedicated to that traffic but is shared with other traffic.

In view of the above, the present invention provides an optical virtual-circuit-switching network system and its optical switch whose bandwidth is scalable and does not require frequent optical-electrical-optical conversion during transmission.

SUMMARY OF THE INVENTION

An objective of the present invention is to provide an optical virtual-circuit-switching network system and its optical switch. The optical switching network system comprises a plurality of optical switches. Each optical switch includes a first set of wavelength selective switches, a first pair of optical fiber amplifiers, and two sets of first splitters used to direct traffic to and from the horizontal optical network subsystem. Each optical switch further includes a second set of wavelength selective switches, a second pair of optical fiber amplifiers, and two sets of second splitters used to direct traffic to and from the vertical optical network subsystem. Each optical switch is designed to receive data from the top-of-rack switch and forward traffic completely within the optical domain, either from the horizontal optical network subsystem to the vertical optical network subsystem or from the vertical optical network subsystem to the horizontal optical network subsystem, and transmit the data to the top-of-rack switch.

The optical switching network system is a high-performance computing (HPC) network architecture. Similar to the electrical-based virtual circuit packet switching, the optical switching network system requires the establishment of an end-to-end optical path for a given traffic flow before transmitting packets, and this optical path can be shared with the traffic flows from other optical paths. Therefore, the optical switching network system is also referred to as a distributed optical virtual-circuit-switching network system (DOVINSY). In contrast to electrical-based virtual circuit switching networks, in optical switching network systems, packets are transmitted from the sending end to the destination end in the optical domain without the need for optical-electrical-optical conversion.

The optical switching network system comprises a plurality of optical switches. These optical switches operate together to facilitate packet transmission through wavelength-based optical channels. These optical channels are managed proactively and reactively by a software defined networking (SDN) based control mechanism. Specifically, the optical channels are made available whenever needed (i.e., proactively) and dynamically established during load balancing operations (i.e., reactively). The optical switching network system features a scalable architecture, high throughput, ultra-low latency, fault tolerance, and high energy efficiency to meet the needs of high-performance computing.

To achieve the above object, the present invention discloses an optical switch comprising an optical outbound handling module, an optical pass around module, and an optical inbound handling module. The optical outbound handling module comprises a multiplexer, at least one first horizontal amplifier, at least one first vertical amplifier, at least one first horizontal splitter, and at least one first vertical splitter. The multiplexer combines a plurality of initial optical signals and outputs at least one first combined optical signal and at least one second combined optical signal. The at least one first horizontal amplifier receives and amplifies the at least one first combined optical signal from the multiplexer. The at least one first vertical amplifier receives and amplifies the at least one second combined optical signal from the multiplexer. The at least one first horizontal splitter receives the at least one first combined optical signal amplified by the at least one first horizontal amplifier and outputs a plurality of first horizontal optical signals to at least one horizontal optical switch. The at least one first vertical splitter receives the at least one second combined optical signal amplified by the at least one first vertical amplifier and outputs a plurality of first vertical optical signals to at least one vertical optical switch. The optical switch further includes at least one second horizontal splitter and at least one second vertical splitter. The at least one second horizontal splitter receives at least one second horizontal optical signal from the at least one horizontal optical switch and outputs a plurality of selectable horizontal optical signals. The at least one second vertical splitter receives at least one second vertical optical signal from the at least one vertical optical switch and outputs a plurality of selectable vertical optical signals. The optical pass around module comprises at least one first horizontal wavelength selective switch, at least one first vertical wavelength selective switch, at least one second horizontal amplifier, at least one second vertical amplifier, at least one third horizontal splitter, and at least one third vertical splitter. The at least one first horizontal wavelength selective switch receives the selectable horizontal optical signals from the at least one second horizontal splitter and outputs at least one first redirected output optical signal. The at least one first vertical wavelength selective switch receives the selectable vertical optical signals from the at least one second vertical splitter and outputs at least one second redirected output optical signal. The at least one second horizontal amplifier receives and amplifies the at least one second redirected output optical signal from the at least one first vertical wavelength selective switch. The at least one second vertical amplifier receives and amplifies the at least one first redirected output optical signal from the at least one first horizontal wavelength selective switch. The at least one third horizontal splitter receives the at least one second redirected output optical signal amplified by the at least one second horizontal amplifier and outputs a plurality of third horizontal optical signals to the at least one horizontal optical switch. The at least one third vertical splitter receives the at least one first redirected output optical signal amplified by the at least one second vertical amplifier and outputs a plurality of third vertical optical signals to the at least one vertical optical switch. The optical inbound handling module comprises at least one second horizontal wavelength selective switch, at least one second vertical wavelength selective switch, an output amplifier, and a demultiplexer. The at least one second horizontal wavelength selective switch receives the selectable horizontal optical signals from the at least one second horizontal splitter and outputs at least one first output optical signal. The at least one second vertical wavelength selective switch receives the selectable vertical optical signals from the at least one second vertical splitter and outputs at least one second output optical signal. The output amplifier receives the at least one first output optical signal from the at least one second horizontal wavelength selective switch, and the at least one second output optical signal from the at least one second vertical wavelength selective switch, and amplifies the first output optical signal and the second output optical signal. The demultiplexer receives the first output optical signal and the second output optical signal amplified by the output amplifier, and decomposes the first output optical signal and the second output optical signal into a plurality of final optical signals.

In one embodiment of the present invention, each of the initial optical signals has a wavelength, and the wavelengths are distinct from each other.

In one embodiment of the present invention, each of the at least one first horizontal amplifier, the at least one first vertical amplifier, the at least one second horizontal amplifier, the at least one second vertical amplifier, and the output amplifier is an erbium-doped optical fiber amplifier (EDFA).

In one embodiment of the present invention, the optical switch connects to a top-of-rack switch, the top-of-rack switch transmits an initial electrical signal to a plurality of dense wavelength-division multiplexing transceivers, and the initial electrical signal is converted to the initial optical signals through the dense wavelength-division multiplexing transceivers. The dense wavelength-division multiplexing transceivers receive the final optical signals from the demultiplexer, and convert each of the final optical signals to a final electrical signal.

In addition, the present invention further discloses an optical virtual-circuit-switching network system comprising a plurality of optical switches and a plurality of dense wavelength-division multiplexing transceivers. The optical switches connect to each other through the optical fibers to form an optical interconnected subsystem. Each of the optical switches comprises an optical outbound handling module, an optical pass around module, and an optical inbound handling module. The optical outbound handling module comprises a multiplexer, at least one first horizontal amplifier, at least one first vertical amplifier, at least one first horizontal splitter, and at least one first vertical splitter. The multiplexer combines a plurality of initial optical signals and outputs at least one first combined optical signal and at least one second combined optical signal. The at least one first horizontal amplifier receives and amplifies the at least one first combined optical signal from the multiplexer. The at least one first vertical amplifier receives and amplifies the at least one second combined optical signal from the multiplexer. The at least one first horizontal splitter receives the at least one first combined optical signal amplified by the at least one first horizontal amplifier and outputs a plurality of first horizontal optical signals to at least one horizontal optical switch. The at least one first vertical splitter receives the at least one second combined optical signal amplified by the at least one first vertical amplifier and outputs a plurality of first vertical optical signals to at least one vertical optical switch. The optical switch further includes at least one second horizontal splitter and at least one second vertical splitter. The at least one second horizontal splitter receives at least one second horizontal optical signal from the at least one horizontal optical switch and outputs a plurality of selectable horizontal optical signals. The at least one second vertical splitter receives at least one second vertical optical signal from the at least one vertical optical switch and outputs a plurality of selectable vertical optical signals. The optical pass around module comprises at least one first horizontal wavelength selective switch, at least one first vertical wavelength selective switch, at least one second horizontal amplifier, at least one second vertical amplifier, at least one third horizontal splitter, and at least one third vertical splitter. The at least one first horizontal wavelength selective switch receives the selectable horizontal optical signals from the at least one second horizontal splitter and outputs at least one first redirected output optical signal. The at least one first vertical wavelength selective switch receives the selectable vertical optical signals from the at least one second vertical splitter and outputs at least one second redirected output optical signal. The at least one second horizontal amplifier receives and amplifies the at least one second redirected output optical signal from the at least one first vertical wavelength selective switch. The at least one second vertical amplifier receives and amplifies the at least one first redirected output optical signal from the at least one first horizontal wavelength selective switch. The at least one third horizontal splitter receives the at least one second redirected output optical signal amplified by the at least one second horizontal amplifier and outputs a plurality of third horizontal optical signals to the at least one horizontal optical switch. The at least one third vertical splitter receives the at least one first redirected output optical signal amplified by the at least one second vertical amplifier and outputs a plurality of third vertical optical signals to the at least one vertical optical switch. The optical inbound handling module comprises at least one second horizontal wavelength selective switch, at least one second vertical wavelength selective switch, an output amplifier, and a demultiplexer. The at least one second horizontal wavelength selective switch receives the selectable horizontal optical signals from the at least one second horizontal splitter and outputs at least one first output optical signal. The at least one second vertical wavelength selective switch receives the selectable vertical optical signals from the at least one second vertical splitter and outputs at least one second output optical signal. The output amplifier receives the at least one first output optical signal from the at least one second horizontal wavelength selective switch, and the at least one second output optical signal from the at least one second vertical wavelength selective switch, and amplifies the first output optical signal and the second output optical signal. The demultiplexer receives the first output optical signal and the second output optical signal amplified by the output amplifier, and decomposes the first output optical signal and the second output optical signal into a plurality of final optical signals. The dense wavelength-division multiplexing transceivers receives the final optical signals from the demultiplexer, and converts each of the final optical signals to a final electrical signal.

In one embodiment of the present invention, the optical virtual-circuit-switching network system further comprises a plurality of top-of-rack switches and a plurality of servers. The top-of-rack switches connect to the optical switches and transmit an initial electrical signal to the dense wavelength-division multiplexing transceivers. The servers individually connect to the top-of-rack switches and interconnect to each other through the optical switches.

In one embodiment of the present invention, the dense wavelength-division multiplexing transceivers convert the initial electrical signal to the initial optical signals.

In one embodiment of the present invention, the optical interconnected subsystem comprises at least one horizontal optical network subsystem and at least one vertical optical network subsystem connected to the horizontal optical network subsystem. The total quantity of the optical switches is equal to the product of the quantity of the at least one horizontal optical network subsystem and the quantity of the at least one vertical optical network subsystem.

In one embodiment of the present invention, the quantity of the optical switches in the at least one horizontal optical network subsystem is equal to the quantity of the optical switches in the at least one vertical optical network subsystem.

In one embodiment of the present invention, the optical switches in the at least one horizontal optical network subsystem are interconnected in a full mesh configuration through a first ribbon fiber, and the optical switches in the at least one vertical optical network subsystem are interconnected in a full mesh configuration through a second ribbon fiber.

After referring to the drawings and the detailed description of embodiments described later, those of ordinary skill in the art can understand other objectives of the present invention, as well as the technical means and implementations of the present invention.

DETAILED DESCRIPTION OF THE PREFERRED EMBODIMENT

Figure 1:
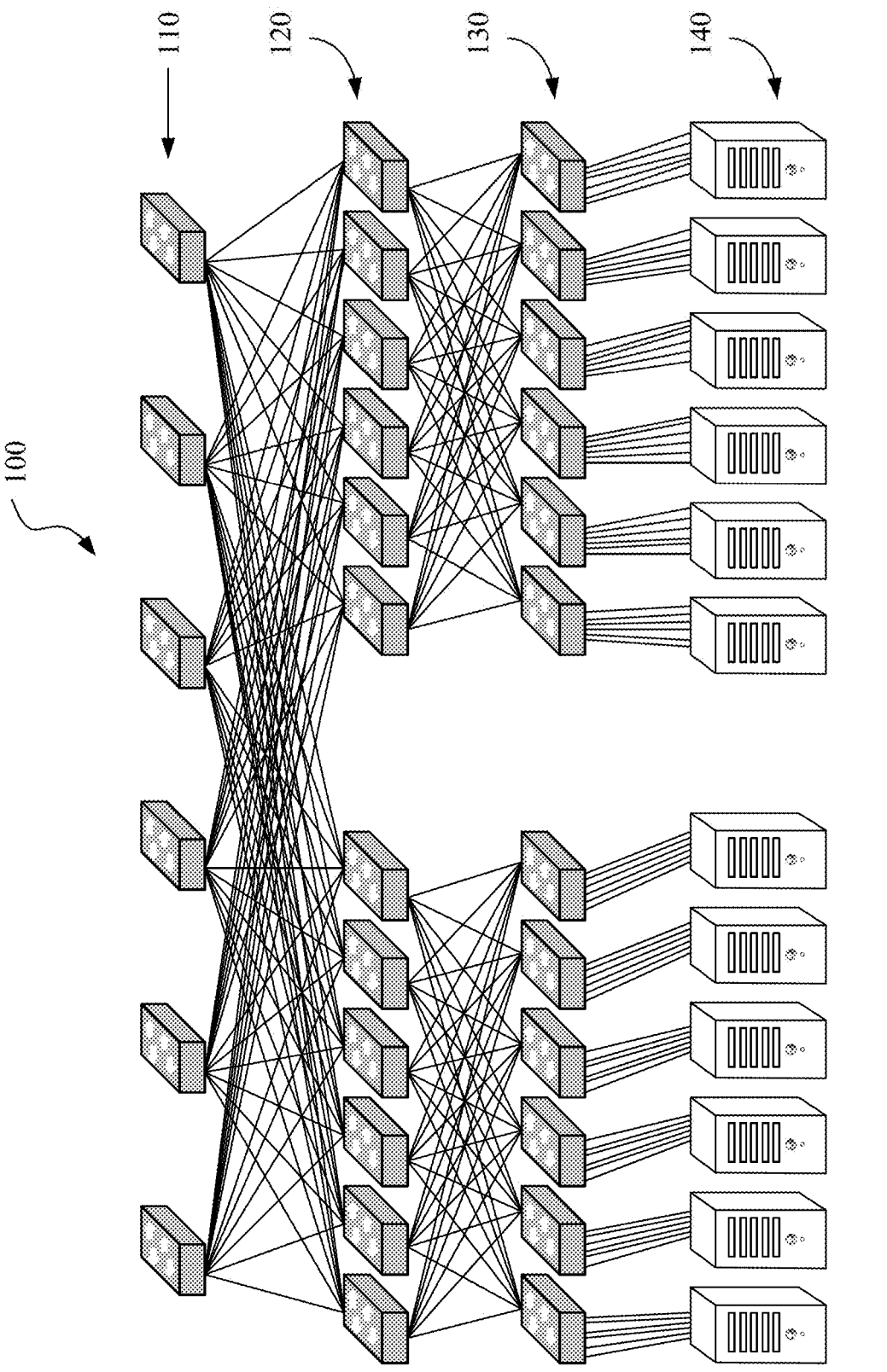
FIG. 1 is a schematic view of the conventional infrastructure based on the electrical switching.
Figure 2:
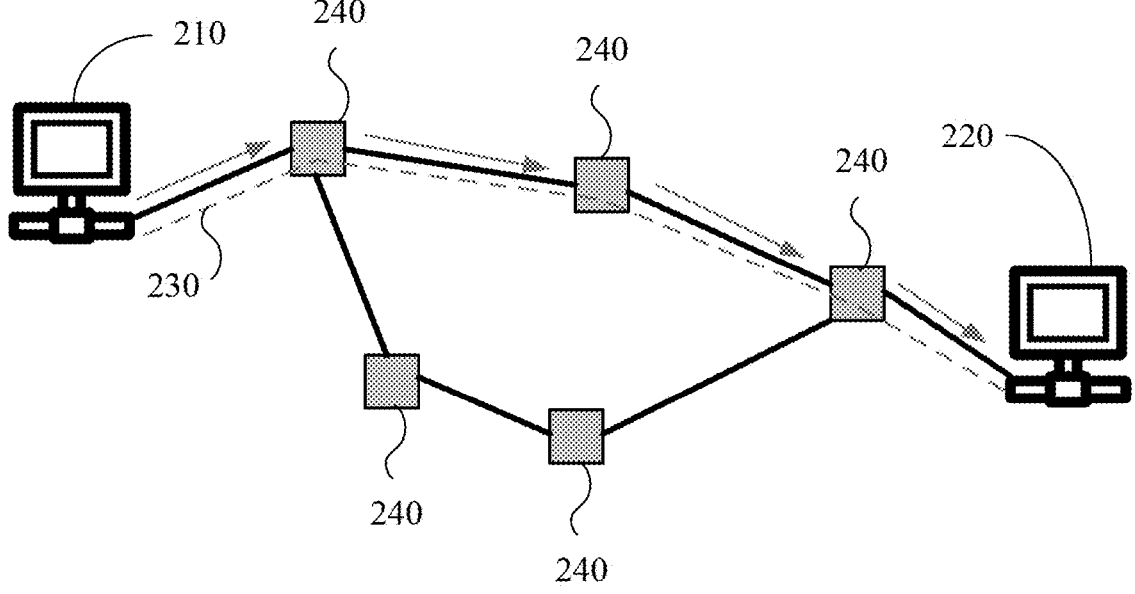
FIG. 2 is a schematic view of the conventional transmission paths and virtual circuits based on the electrical switching.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 3:
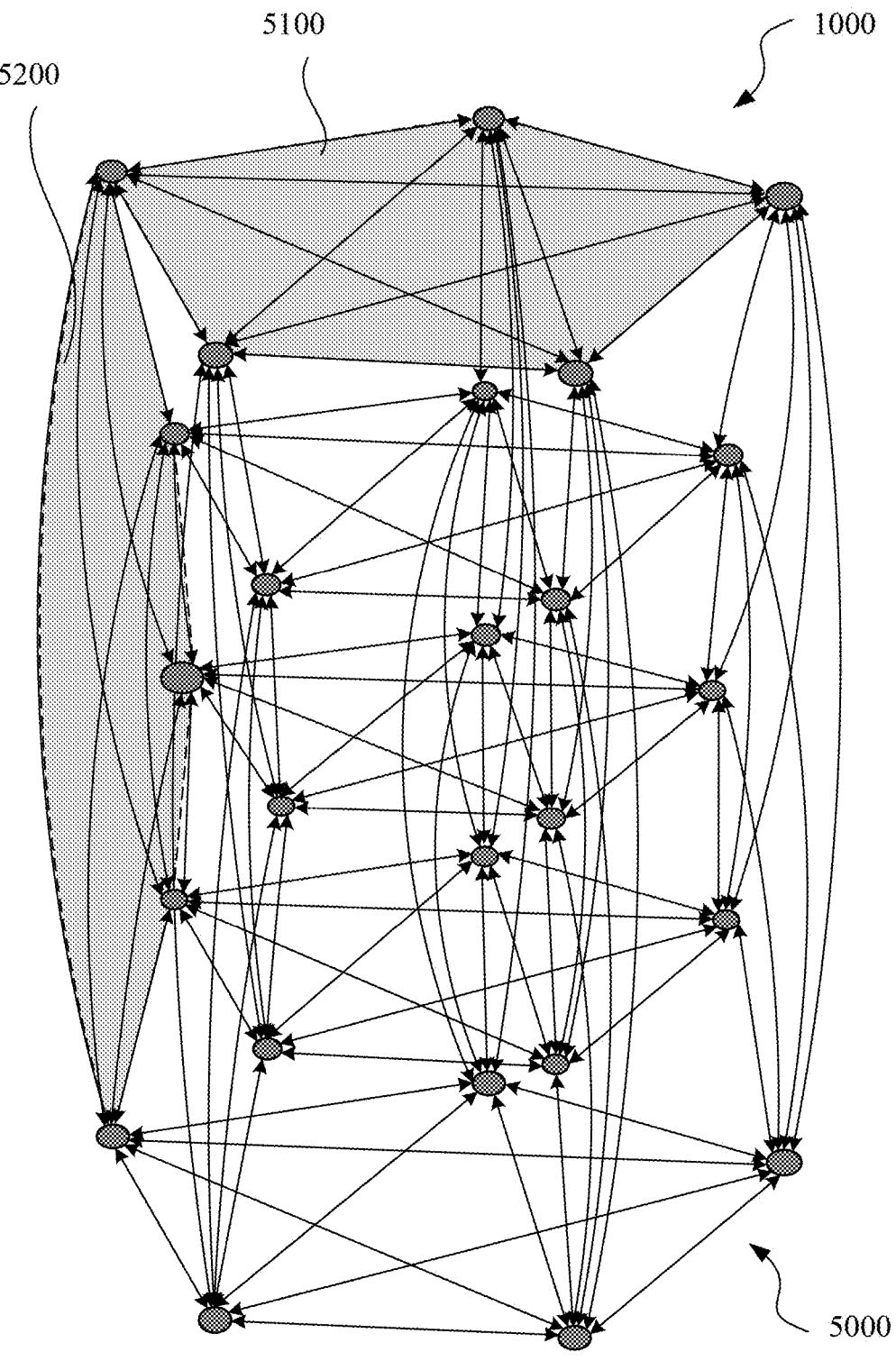
FIG. 3 is a schematic view of the optical virtual-circuit-switching network system of the present invention.
Figure 4:
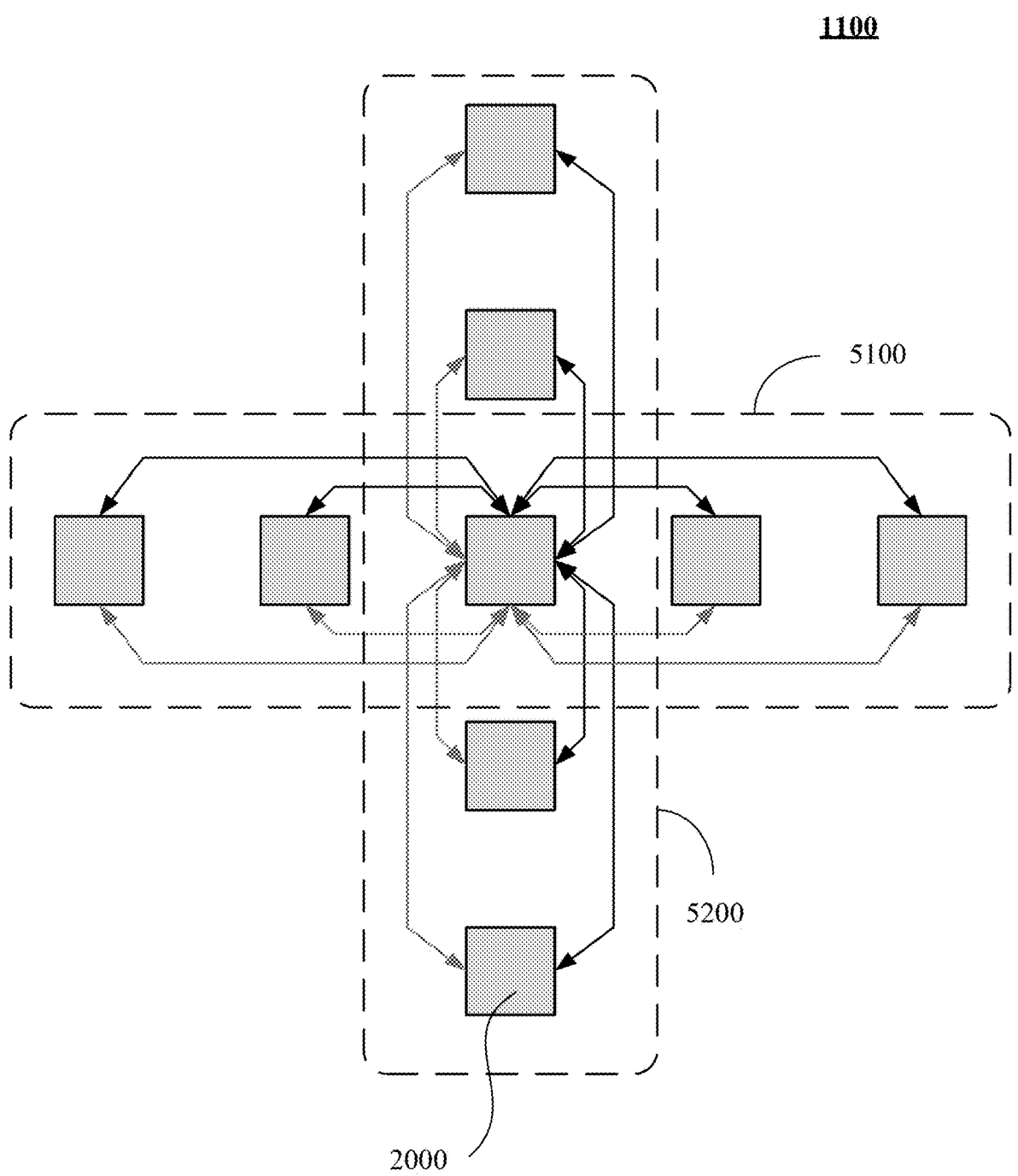
FIG. 4 is a schematic view of the relationship between the horizontal optical network subsystem and the vertical optical network subsystem of the present invention.
Figure 5:
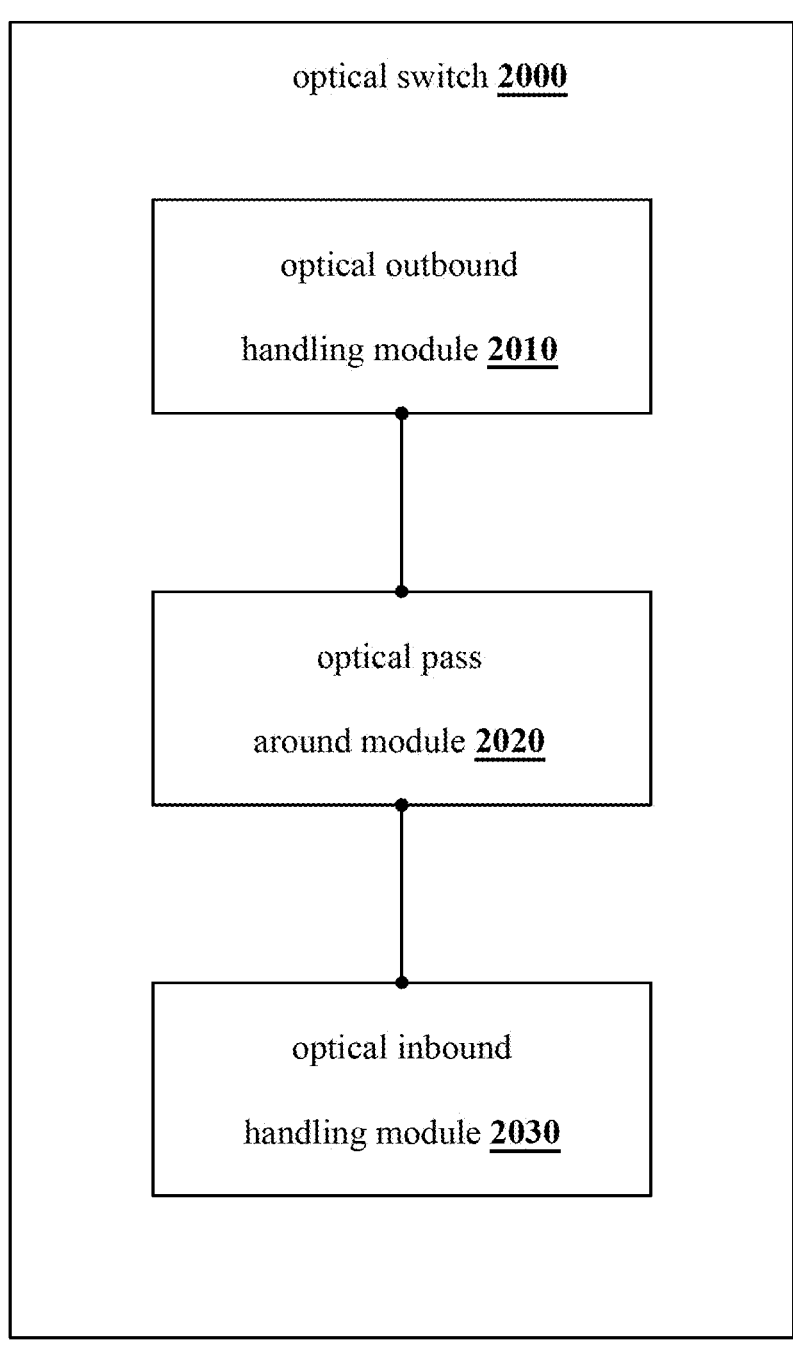
FIG. 5 is a schematic view of the optical switch of the present invention.
Figure 6:
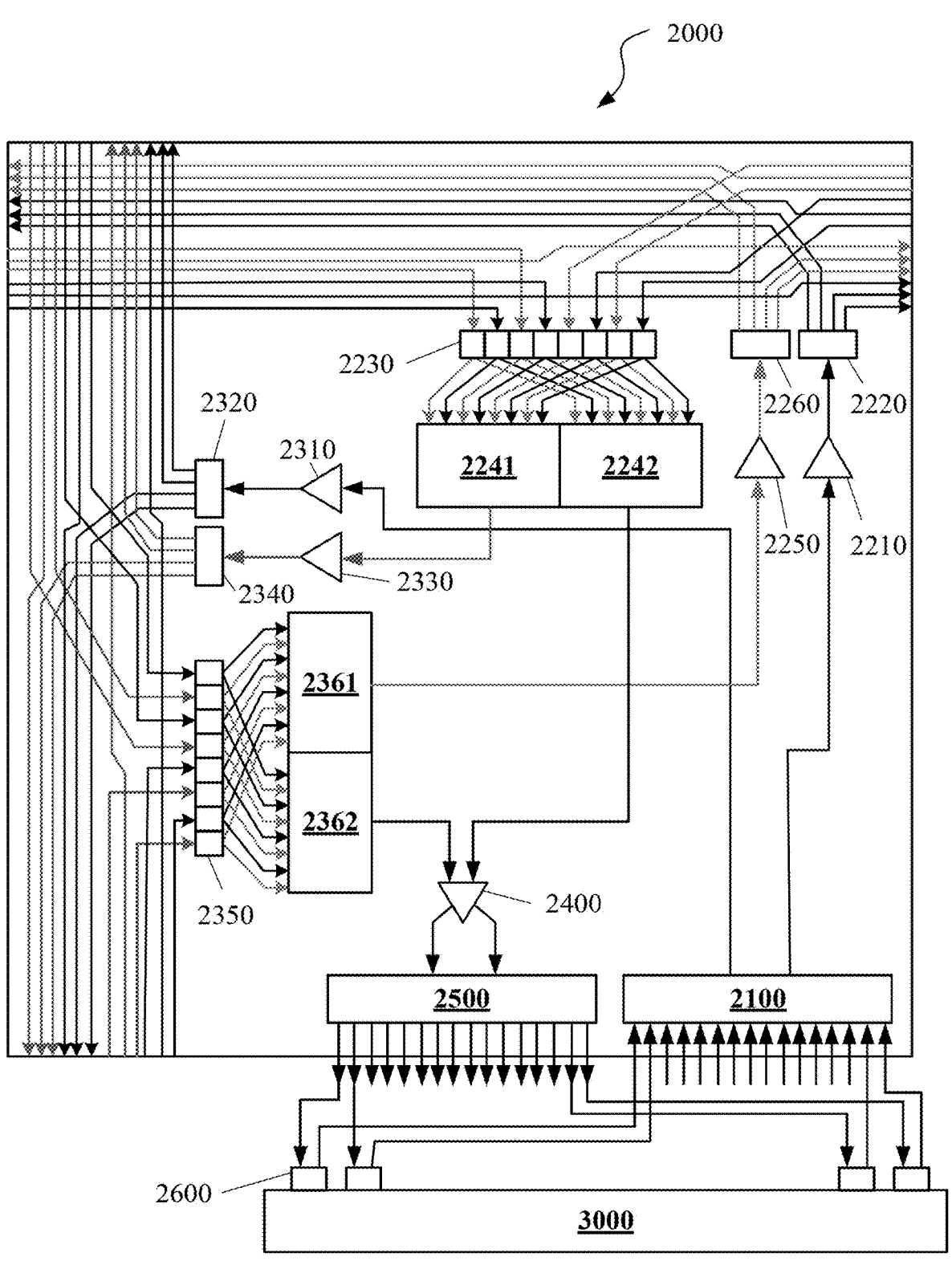
FIG. 6 is a schematic diagram of the circuit in the optical switch of the present invention.

Please refer to FIG. 3 to FIG. 6. FIG. 3 depicts an embodiment of an optical switching network system 1000 of the present invention. FIG. 4 is a schematic view showing the horizontal optical network subsystem and the vertical optical network subsystem. FIG. 5 and FIG. 6 are respectively a schematic view and a circuit diagram of the optical switch 2000. The optical switching network system 1000 includes a plurality of optical switches 2000 connected to each other through the optical fibers to form an optical interconnected subsystem 1100. The optical switches 2000 individually connect to a top-of-rack switch 3000, and the servers (not shown in the figures) connect to the corresponding top-of-rack switches 3000. In other words, the servers connect to each other through the optical interconnected subsystem 1100.

The optical interconnected subsystem 1100 includes at least one horizontal optical network subsystem (i.e., Horizontal net; H-net) 5100 and at least one vertical optical network subsystem (i.e., Vertical net; V-net) 5200. The optical switches 2000 in each of the horizontal optical network subsystems 5100 are interconnected in a full mesh configuration through a first ribbon fiber (not shown in the figure), and the optical switches 2000 in each of the vertical optical network subsystems 5200 are also interconnected in a full mesh configuration through a second ribbon fiber (not shown in the figure). In other words, each of the optical switches 2000 connects to the adjacent optical switches 2000 through the horizontal optical network subsystem 5100 and the vertical optical network subsystem 5200 respectively.

For example, please refer to FIG. 3 and FIG. 4. Each of the optical switches 2000 interconnects in a full mesh configuration with the other four optical switches 2000 through the horizontal optical network subsystem 5100, and interconnects in a full mesh configuration with the other four optical switches 2000 through the vertical optical network subsystem 5200. When transmitting packets, each of the optical switches 2000 is capable of transmitting or receiving traffic in each of the horizontal optical network subsystems 5100 or each of the vertical optical network subsystems 5200. Additionally, the optical switches 2000 are designed to transmit traffic between the horizontal optical network subsystems 5100 and the vertical optical network subsystems 5200 and are capable of bidirectional transmission.

The optical switching network system 1000 is composed of N×S optical switches 2000, wherein N is the quantity of the horizontal optical network subsystems 5100, and S is the quantity of the vertical optical network subsystems 5200. Each of the optical switches 2000 directly connects to one horizontal optical network subsystem 5100 and one vertical optical network subsystem 5200. In other words, the total quantity of the optical switches 2000 is equal to the product of the quantity of the horizontal optical network subsystems 5100 and the quantity of vertical optical network subsystems 5200.

For example, please refer to FIG. 3, which includes a total of five horizontal optical network subsystems (i.e., N=5) and five vertical optical network subsystems (i.e., S=5). Therefore, in the optical switching network system 1000 shown in FIG. 3, there are a total of twenty-five (5×5) optical switches 2000. The scale of the optical switching network system 1000 can be expanded by increasing the quantity of any of the horizontal optical network subsystems 5100, the vertical optical network subsystems 5200, and the optical switches 2000.

In this embodiment, the quantity of the optical switches 2000 included in the horizontal optical network subsystem 5100 is equal to the quantity of the optical switches 2000 included in the vertical optical network subsystem 5200. When using the optical switching network system 1000, all optical switches 2000 are typically activated, but it is also possible to activate only a part of the optical switches 2000 based on actual requirements. Furthermore, if some paths become unusable due to partial damage to the activated optical switches 2000, the packets can be rerouted through software control onto alternative paths.

The horizontal optical network subsystems 5100 and the vertical optical network subsystems 5200 can be referred to the schematic view shown in FIG. 4. FIG. 4 only shows one set of horizontal optical network subsystem 5100 and one set of vertical optical network subsystem 5200 for illustration. In the optical switching network system 1000, all of the optical switches 2000 in each of the horizontal optical network subsystems 5100 and each of the vertical optical network subsystems 5200 are interconnected in a full mesh configuration. Furthermore, each of the optical switches 2000 is bidirectionally connected and capable of two-way communication.

Please refer to FIG. 5 and FIG. 6, which respectively depict a schematic diagram of the optical switches 2000 of the present invention as an embodiment. Each of the optical switches 2000 at least includes an optical outbound handling module 2010, an optical pass around module 2020, and an optical inbound handling module 2030. When an optical signal is uploaded from one of the top-of-rack switches 3000 to one of the optical switches 2000, it can be transmitted to another optical switch through the optical outbound handling module 2010 via the horizontal optical network subsystems 5100 or the vertical optical network subsystems 5200. Subsequently, it is dropped through the optical inbound handling module 2030 of another optical switch to the corresponding top-of-rack switch 3000 which is connected to the optical switch. Alternatively, it can be further transmitted through the optical pass around module 2020 of the optical switch, either via the horizontal optical network subsystems 5100 or the vertical optical network subsystems 5200, and then routed to further another optical switch. Thereafter, it is dropped through the optical inbound handling module 2030 of the optical switch and delivered to the top-of-rack switch connected to the respective optical switch.

The optical outbound handling module 2010 includes a multiplexer 2100, at least one first horizontal amplifier 2210, at least one first vertical amplifier 2310, at least one first horizontal splitter 2220, and at least one first vertical splitter 2320.

The top-of-rack switches 3000 transmit an initial electrical signal to a plurality of dense wavelength-division multiplexing transceivers 2600. Specifically, the dense wavelength-division multiplexing transceivers 2600 convert the initial electrical signal to the initial optical signals, and then transmit the initial optical signals to the multiplexer 2100. Each of the initial optical signals has a wavelength, and the wavelengths are different from each other. It should be noted that after the initial optical signals enter the optical switch 2000, there is no need for additional optical-electrical-optical conversion of the optical signals at any stage of signal processing.

The multiplexer 2100 combines the initial optical signals and outputs at least one first combined optical signal and at least one second combined optical signal. The at least one first horizontal amplifier 2210 receives the at least one first combined optical signal from the multiplexer 2100 and amplifies the at least one first combined optical signal. The at least one first horizontal splitter 2220 receives the at least one first combined optical signal amplified by the at least one first horizontal amplifier 2210 and outputs a plurality of first horizontal optical signals to the at least one other horizontal optical switch 2000.

Specifically, please refer to FIG. 6. It is assumed that the quantity of the initial optical signals is sixteen, which means there are sixteen optical signals with different wavelengths. One wavelength is used to establish one optical channel. The quantity of wavelengths is related to the port count of the ToR switches and the optical switching network system 1000. The multiplexer 2100 combines the initial optical signals, then duplicates an identical signal, which are subsequently transmitted separately to the horizontal amplifier and the vertical amplifier. The quantity of the first combined optical signals and the second combined optical signals varies based on the size of the optical switching network system 1000 and the quantity of wavelengths.

The first horizontal amplifier 2210 is an erbium-doped optical fiber amplifier (EDFA) used to enhance the power of the first combined optical signal. The optical signals attenuate during the optical fiber transmission process. The use of EDFA is capable of amplifying the signals during the optical signal transmission process to maintain the strength and quality of the signal, enabling long-distance optical fiber communication.

Splitters are commonly used to split a single optical signal into two or more output optical signals for signal distribution, with the power of each output signal being proportional to the power of the input signal. Splitters typically have one input port and two or more output ports. Based on specific splitting ratios, splitters distribute the input optical signal to various output ports. In the embodiment shown in FIG. 6, the first horizontal splitter 2220 is a one-input four-output splitter, with its input being a first combined optical signal, and its output consisting of four first horizontal optical signals. Among the first horizontal optical signals, two of the first horizontal optical signals are transmitted to two of the horizontal optical switches in the east (i.e., the right side in the figure), and the other two of the first horizontal optical signals are transmitted to two of the horizontal optical switches in the west (i.e., the left side in the figure).

The at least one first vertical amplifier 2310 receives the at least one second combined optical signal from the multiplexer 2100 and amplifies the at least one second combined optical signal. The first vertical amplifier 2310 is also an erbium-doped optical fiber amplifier used to enhance the power of the second combined optical signal.

The at least one first vertical splitter 2320 receives the at least one second combined optical signal amplified by the at least one first vertical amplifier 2310, and outputs a plurality of first vertical optical signals to the at least one vertical optical switch 2000. The optical switch 2000 further includes at least one second horizontal splitter 2230, which receives at least one second horizontal optical signal from the at least one horizontal optical switch 2000, and outputs a plurality of selectable horizontal optical signals.

For example, please further refer to FIG. 6. In the embodiment shown in FIG. 6, the first vertical splitter 2320 is a one-input four-output splitter, with its input being a second combined optical signal, and its output consisting of four first vertical optical signals. Among the first vertical optical signals, two of the first vertical optical signals are transmitted to two of the vertical optical switches in the south (i.e., the top side in the figure), and the other two of the first vertical optical signals are transmitted to two of the vertical optical switches in the north (i.e., the bottom side in the figure).

Additionally, in this embodiment, the quantity of the second horizontal splitters 2230 is eight, each being a one-input two-output splitter. The input signals for four of the second horizontal splitters 2230 are the second horizontal optical signals received from the horizontal optical switches on the east side, and the outputs are two selectable horizontal optical signals respectively. The input signals for the other four second horizontal splitters 2230 are the second horizontal optical signals received from the horizontal optical switches on the west side, and the outputs are two selectable horizontal optical signals respectively. Therefore, the second horizontal splitters 2230 output a total of sixteen selectable horizontal optical signals. The optical switch 2000 further includes at least one second vertical splitter 2350 that receives at least one second vertical optical signal from the at least one vertical optical switch 2000, and outputs a plurality of the selectable vertical optical signals.

Similarly, in this embodiment, the quantity of the second vertical splitters 2350 is eight, each being a one-input two-output splitter. The input signals for four of the second vertical splitters 2350 are the third vertical optical signals received from the vertical optical switches on the south side, and the outputs are two selectable vertical optical signals respectively. The input signals for the other four second vertical splitters 2350 are the third vertical optical signals received from the horizontal optical switches on the north side, and the outputs are two selectable vertical optical signals respectively. Therefore, the second vertical splitters 2350 output a total of sixteen of the selectable vertical optical signals.

The optical pass around module 2020 includes at least one first horizontal wavelength selective switch 2241, at least one first vertical wavelength selective switch 2361, at least one second horizontal amplifier 2250, at least one second vertical amplifier 2330, at least one third horizontal splitter 2260, and at least one third vertical splitter 2340. The first horizontal wavelength selective switch 2241 receives the selectable horizontal optical signals from the at least one second horizontal splitter 2230 and outputs at least one first redirected output optical signal. The first vertical wavelength selective switch 2361 receives the selectable vertical optical signals from the at least one second vertical splitter 2350 and outputs at least one second redirected output optical signal.

The wavelength selective switch is used to select the wavelength of the transmitted optical signals. When the optical signals need to be transmitted from a plurality of input optical paths to a plurality of output optical paths, the wavelength selective switch can select any number of wavelengths from a plurality of input optical paths and transmit them to a plurality of output optical paths, thus achieving optical path switching function. Moreover, the wavelength selective switch can also consolidate and distribute the signals from a plurality of input optical paths.

Specifically, in the embodiment shown in FIG. 6, the quantity of the first horizontal wavelength selective switch 2241 is one, and the first horizontal wavelength selective switch 2241 is a wavelength selective switch with eight input ports and one output port (8×1). The wavelength selective switch can select different wavelength signals in the optical switching network system 1000 and route the selectable wavelength signals to the output port, providing high speed and low insertion loss to handle high-capacity optical signals. The first horizontal wavelength selective switch 2241 outputs the first redirected output optical signal, and transmits it to the second vertical amplifier 2330.

Similarly, the quantity of the first vertical wavelength selective switch 2361 is one, and the first vertical wavelength selective switch 2361 is a wavelength selective switch with eight input ports and one output port (8×1). The first vertical wavelength selective switch 2361 outputs the second redirected output optical signal, and transmits it to the second horizontal amplifier 2250.

The at least one second horizontal amplifier 2250 receives at least one second redirected output optical signal from the at least one first vertical wavelength selective switch 2361, and amplifies the at least one second redirected output optical signal to compensate for any power loss. The second horizontal amplifier 2250 is an erbium-doped optical fiber amplifier.

The at least one second vertical amplifier 2330 receives the at least one first redirected output optical signal from the at least one first horizontal wavelength selective switch 2241, and amplifies the at least one first redirected output optical signal. The second vertical amplifier 2330 is an erbium-doped optical fiber amplifier.

The at least one third horizontal splitter 2260 receives the at least one second redirected output optical signal amplified by the at least one second horizontal amplifier 2250, and outputs a plurality of third horizontal optical signals to the at least one horizontal optical switch 2000.

The second redirected output optical signal originates from the plurality of the third vertical optical signals received by the second vertical splitter 2350 from the vertical optical network, that is, transmitted in the vertical optical network subsystem 5200, then combined through the first vertical wavelength selective switch 2361. After being output to the second horizontal amplifier 2250, the optical signals then enter the horizontal optical network subsystem 5100.

The at least one third vertical splitter 2340 receives the at least one first redirected output optical signal amplified by the at least one second vertical amplifier 2330, and outputs a plurality of third vertical optical signals to the at least one vertical switch 2000.

The first redirected output optical signal originates from the plurality of the second horizontal optical signals received by the second horizontal splitter 2230 from the horizontal optical network, that is, transmitted in the horizontal optical network subsystem 5100, then combined through the first horizontal wavelength selective switch 2241. After being output to the second vertical amplifier 2330, the optical signals then enter the vertical optical network subsystem 5200.

To achieve the aforementioned function, each of the optical switches 2000 is equipped with two of the 12-core ribbon fiber bundles for the horizontal optical network subsystems 5100 and the vertical optical network subsystems 5200.

The optical inbound handling module includes at least one second horizontal wavelength selective switch 2242, at least one second vertical wavelength selective switch 2362, an output amplifier 2400, and a demultiplexer 2500.

The at least one second horizontal wavelength selective switch 2242 receives the selectable horizontal optical signals and outputs at least one first output optical signal. The at least one second vertical wavelength selective switch 2362 receives the selectable vertical optical signals and outputs at least one second output optical signal. The output amplifier 2400 receives the first output optical signal from the second horizontal wavelength selective switch 2242 and the second output optical signal from the second vertical wavelength selective switch 2362, and amplifies the first output optical signal and the second output optical signal.

The demultiplexer 2500 receives the first output optical signal and the second output optical signal amplified by the output amplifier 2400, and decomposes the amplified first output optical signal and the amplified second output optical signal into a plurality of final optical signals. The wavelength of each final optical signal differs from the others. Subsequently, the dense wavelength-division multiplexing transceivers 2600 receive the final optical signals from the demultiplexer 2500, convert each of the final optical signals into a final electrical signal, and then enters the corresponding port of the top-of-rack switch.

It should be noted that the optical switching network system 1000 depicted in FIG. 3, the horizontal optical network subsystem 5100 and the vertical optical network subsystem 5200 depicted in FIG. 4, and the optical switch 2000 depicted in FIG. 6 are based on the optical switching network system 1000 composed of twenty-five optical switches 2000 for illustration. In other embodiments, the quantity of the optical switches 2000 may be increased or decreased. The quantity of components in the optical switches 2000 and the quantity of ports of each component correspond to the quantity of the optical switches 2000 included in the optical switching network system 1000.

Furthermore, it should be noted that the quantity of amplifiers, splitters, wavelength selective switches, core ribbon fiber bundles and the quantity of ports can be adjusted according to the quantity of the optical switches 2000 included in the optical switching network system 1000.

According to the above, the optical switching network system of the present invention is a distributed network architecture that interconnects a plurality of server architectures through the same number of the optical switches. Each of the server architectures is equipped with a top-of-rack switch and an optical switch for interconnection between server architectures. Each of the optical switches individually connects to all the other optical switches included in the horizontal optical network subsystems and vertical optical network subsystems in which it is located.

During transmission, each of the optical switches is capable of transmitting packets between the horizontal optical network subsystem and the vertical optical network subsystem, and enabling the bidirectional transmission. In order to transmit the optical signals from the horizontal optical network subsystem to the vertical optical network subsystem, or from the vertical optical network subsystem to the horizontal optical network subsystem, both the horizontal transmission and the vertical transmission in the optical switch involve the wavelength selective switches, the fiber amplifiers, and the splitters.

When the optical signal is output from the wavelength selective switch for horizontal transmission, it can be redirected to the fiber amplifier and splitter for vertical transmission. When the optical signal is output from the wavelength selective switch for vertical transmission, it can be redirected to the fiber amplifier and splitter for horizontal transmission. This enables the optical signals to be transmitted within the same horizontal optical network subsystems and vertical optical network subsystems.

Although the present invention has been described in considerable detail with reference to certain embodiments thereof, other embodiments are possible. Therefore, the spirit and scope of the appended claims should not be limited to the description of the embodiments contained herein.

What is claimed is:

1. An optical switch, comprising:
an optical outbound handling module, comprising:
a multiplexer combining a plurality of initial optical signals, and outputting at least one first combined optical signal and at least one second combined optical signal;
at least one first horizontal amplifier receiving and amplifying the at least one first combined optical signal from the multiplexer;
at least one first vertical amplifier receiving and amplifying the at least one second combined optical signal from the multiplexer;
at least one first horizontal splitter receiving the at least one first combined optical signal amplified by the at least one first horizontal amplifier, and outputting a plurality of first horizontal optical signals to at least one horizontal optical switch; and
at least one first vertical splitter receiving the at least one second combined optical signal amplified by the at least one first vertical amplifier, and outputting a plurality of first vertical optical signals to at least one vertical optical switch;
at least one second horizontal splitter receiving at least one second horizontal optical signal from the at least one horizontal optical switch, and outputting a plurality of selectable horizontal optical signals;
at least one second vertical splitter receiving at least one second vertical optical signal from the at least one vertical optical switch, and outputting a plurality of selectable vertical optical signals;
an optical pass around module, comprising:
at least one first horizontal wavelength selective switch receiving the selectable horizontal optical signals from the at least one second horizontal splitter, and outputting at least one first redirected output optical signal;
at least one first vertical wavelength selective switch receiving the selectable vertical optical signals from the at least one second vertical splitter, and outputting at least one second redirected output optical signal;

at least one second horizontal amplifier receiving and amplifying the at least one second redirected output optical signal from the at least one first vertical wavelength selective switch;

at least one second vertical amplifier receiving and amplifying the at least one first redirected output optical signal from the at least one first horizontal wavelength selective switch;

at least one third horizontal splitter receiving the at least one second redirected output optical signal amplified by the at least one second horizontal amplifier, and outputting a plurality of third horizontal optical signals to the at least one horizontal optical switch; and at least one third vertical splitter receiving the at least one first redirected output optical signal amplified by the at least one second vertical amplifier, and outputting a plurality of third vertical optical signals to the at least one vertical optical switch;

an optical inbound handling module, comprising:

at least one second horizontal wavelength selective switch receiving the selectable horizontal optical signals from the at least one second horizontal splitter, and outputting at least one first output optical signal;

at least one second vertical wavelength selective switch receiving the selectable vertical optical signals from the at least one second vertical splitter, and outputting at least one second output optical signal;

an output amplifier receiving the at least one first output optical signal from the at least one second horizontal wavelength selective switch, and the at least one second output optical signal from the at least one second vertical wavelength selective switch, and amplifying the first output optical signal and the second output optical signal; and a demultiplexer receiving the first output optical signal and the second output optical signal amplified by the output amplifier, and decomposing the first output optical signal and the second output optical signal into a plurality of final optical signals.

2. The optical switch of claim 1, wherein each of the initial optical signals has a wavelength, and the wavelengths are distinct from each other.

3. The optical switch of claim 1, wherein each of the at least one first horizontal amplifier, the at least one first vertical amplifier, the at least one second horizontal amplifier, the at least one second vertical amplifier, and the output amplifier is an erbium-doped optical fiber amplifier.

4. The optical switch of claim 1, wherein the optical switch connects to a top-of-rack switch, the top-of-rack switch transmits an initial electrical signal to a plurality of dense wavelength-division multiplexing transceivers, and the initial electrical signal is converted to the initial optical signals through the dense wavelength-division multiplexing transceivers, and wherein the dense wavelength-division multiplexing transceivers receive the final optical signals from the demultiplexer, and convert each of the final optical signals to a final electrical signal.

5. An optical virtual-circuit-switching network system, comprising:

a plurality of optical switches connected to each other through the optical fibers to form an optical interconnected subsystem, wherein each of the optical switches comprises:

an optical outbound handling module, comprising:

a multiplexer combining a plurality of initial optical signals, and outputting at least one first combined optical signal and at least one second combined optical signal;

at least one first horizontal amplifier receiving and amplifying the at least one first combined optical signal from the multiplexer;

at least one first vertical amplifier receiving and amplifying the at least one second combined optical signal from the multiplexer;

at least one first horizontal splitter receiving the at least one first combined optical signal amplified by the at least one first horizontal amplifier, and outputting a plurality of first horizontal optical signals to at least one horizontal optical switch; and at least one first vertical splitter receiving the at least one second combined optical signal amplified by the at least one first vertical amplifier, and outputting a plurality of first vertical optical signals to at least one vertical optical switch;

at least one second horizontal splitter receiving at least one second horizontal optical signal from the at least one horizontal optical switch, and outputting a plurality of selectable horizontal optical signals;

at least one second vertical splitter receiving at least one second vertical optical signal from the at least one vertical optical switch, and outputting a plurality of selectable vertical optical signals;

an optical pass around module, comprising:

at least one first horizontal wavelength selective switch receiving the selectable horizontal optical signals from the at least one second horizontal splitter, and outputting at least one first redirected output optical signal;

at least one first vertical wavelength selective switch receiving the selectable vertical optical signals from the at least one second vertical splitter, and outputting at least one second redirected output optical signal;

at least one second horizontal amplifier receiving and amplifying the at least one second redirected output optical signal from the at least one first vertical wavelength selective switch;

at least one second vertical amplifier receiving and amplifying the at least one first redirected output optical signal from the at least one first horizontal wavelength selective switch;

at least one third horizontal splitter receiving the at least one second redirected output optical signal amplified by the at least one second horizontal amplifier, and outputting a plurality of third horizontal optical signals to the at least one horizontal optical switch; and at least one third vertical splitter receiving the at least one first redirected output optical signal amplified by the at least one second vertical amplifier, and outputting a plurality of third vertical optical signals to the at least one vertical optical switch;

an optical inbound handling module, comprising:

at least one second horizontal wavelength selective switch receiving the selectable horizontal optical signals from the at least one second horizontal splitter, and outputting at least one first output optical signal;

at least one second vertical wavelength selective switch receiving the selectable vertical optical signals from the at least one second vertical splitter, and outputting at least one second output optical signal;

an output amplifier receiving the at least one first output optical signal from the at least one second horizontal wavelength selective switch, and the at least one second output optical signal from the at least one second vertical wavelength selective switch, and amplifying the first output optical signal and the second output optical signal; and a demultiplexer receiving the first output optical signal and the second output optical signal amplified by the output amplifier, and decomposing the first output optical signal and the second output optical signal into a plurality of final optical signals; and a plurality of dense wavelength-division multiplexing transceivers receiving the final optical signals from the demultiplexer, and converting each of the final optical signals to a final electrical signal.

6. The optical virtual-circuit-switching network system of claim 5, further comprising:

a plurality of top-of-rack switches connecting to the optical switches, and transmitting an initial electrical signal to the dense wavelength-division multiplexing transceivers; and a plurality of servers individually connecting to the top-of-rack switches, and interconnecting to each other through the optical switches.

7. The optical virtual-circuit-switching network system of claim 6, wherein the dense wavelength-division multiplexing transceivers convert the initial electrical signal to the initial optical signals.

8. The optical virtual-circuit-switching network system of claim 5, wherein the optical interconnected subsystem comprises at least one horizontal optical network subsystem and at least one vertical optical network subsystem connected to the horizontal optical network subsystem, and wherein a total quantity of the optical switches is equal to a product of a quantity of the at least one horizontal optical network subsystem and a quantity of the at least one vertical optical network subsystem.

9. The optical virtual-circuit-switching network system of claim 8, wherein a quantity of the optical switches in the at least one horizontal optical network subsystem is equal to a quantity of the optical switches in the at least one vertical optical network subsystem.

10. The optical virtual-circuit-switching network system of claim 8, wherein the optical switches in the at least one horizontal optical network subsystem are interconnected in a full mesh configuration through a first ribbon fiber, and the optical switches in the at least one vertical optical network subsystem are interconnected in a full mesh configuration through a second ribbon fiber.

* * * * *